United States Patent
Huber et al.

(10) Patent No.: US 9,582,348 B2
(45) Date of Patent: Feb. 28, 2017

(54) CORRECTING OVERLAPPING DATA SETS IN A VOLUME

(71) Applicant: INTERNATIONAL BUSINESS MACHINES CORPORATION, Armonk, NY (US)

(72) Inventors: Harold S. Huber, Tucson, AZ (US); Joseph V. Malinowski, Bridgeview, IL (US); David C. Reed, Tucson, AZ (US); Max D. Smith, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 133 days.

(21) Appl. No.: 14/624,482

(22) Filed: Feb. 17, 2015

(65) Prior Publication Data
US 2016/0239386 A1    Aug. 18, 2016

(51) Int. Cl.
  *G06F 11/00* (2006.01)
  *G06F 11/07* (2006.01)
  *G06F 11/14* (2006.01)

(52) U.S. Cl.
  CPC ........ *G06F 11/0727* (2013.01); *G06F 11/079* (2013.01); *G06F 11/0793* (2013.01); *G06F 11/1469* (2013.01)

(58) Field of Classification Search
  CPC .................................................. G06F 11/0727
  See application file for complete search history.

(56) References Cited

U.S. PATENT DOCUMENTS

| | | | |
|---|---|---|---|
| 7,158,999 B2 | 1/2007 | Pace et al. | |
| 7,707,016 B2* | 4/2010 | Shaw | G06F 17/5018 703/1 |
| 8,140,886 B2 | 3/2012 | Lehr et al. | |
| 8,145,942 B2 | 3/2012 | Nguyen | |
| 8,694,881 B2* | 4/2014 | Alderucci | G06F 3/0481 715/229 |
| 8,782,360 B2 | 7/2014 | Cammarata et al. | |
| 9,009,424 B2* | 4/2015 | Chambliss | G06F 12/16 711/114 |
| 9,110,819 B2* | 8/2015 | Cilfone | G06F 11/1076 |
| 2005/0182888 A1* | 8/2005 | Murotani | G06F 11/1456 711/1 |

(Continued)

OTHER PUBLICATIONS

IBM, "DFSMSdfp Advanced Services", Third Edition, Jun. 2003, © Copyright International Business Machines Corporation 1979, 2003, Total 536 pp.

(Continued)

*Primary Examiner* — Christopher McCarthy
(74) *Attorney, Agent, or Firm* — David W. Victor; Konrad Raynes Davda & Victor LLP

(57) ABSTRACT

Provided are a computer program product, system, and method for correcting overlapping data sets in a volume. A determination is made of overlapping data sets in a first volume that are assigned a same data unit. The data sets in the first volume that are not assigned a same data unit are copied to a second volume. The same data unit is processed to determine one of the overlapping data sets for which the same data unit is intended and copied to the determined overlapping data set in the second volume.

24 Claims, 7 Drawing Sheets

(56) References Cited

U.S. PATENT DOCUMENTS

| | | | | |
|---|---|---|---|---|
| 2006/0129363 A1* | 6/2006 | Shaw | ............... | G06F 17/5018 703/2 |
| 2007/0280407 A1* | 12/2007 | Kunze | ............... | A61B 6/466 378/4 |
| 2008/0168240 A1* | 7/2008 | Nagata | ............... | G06F 3/061 711/154 |
| 2010/0094811 A1* | 4/2010 | Lehr | ............... | G06F 17/30067 707/674 |
| 2012/0179886 A1* | 7/2012 | Prahlad | ............... | G06F 11/1451 711/162 |
| 2013/0111127 A1* | 5/2013 | Araki | ............... | G06F 3/0605 711/114 |
| 2014/0006853 A1 | 1/2014 | Dudgeon et al. | | |

OTHER PUBLICATIONS

IBM, "z/OS concepts", © Copyright IBM Corporation 2006, 2010, Total 120 pp.

* cited by examiner

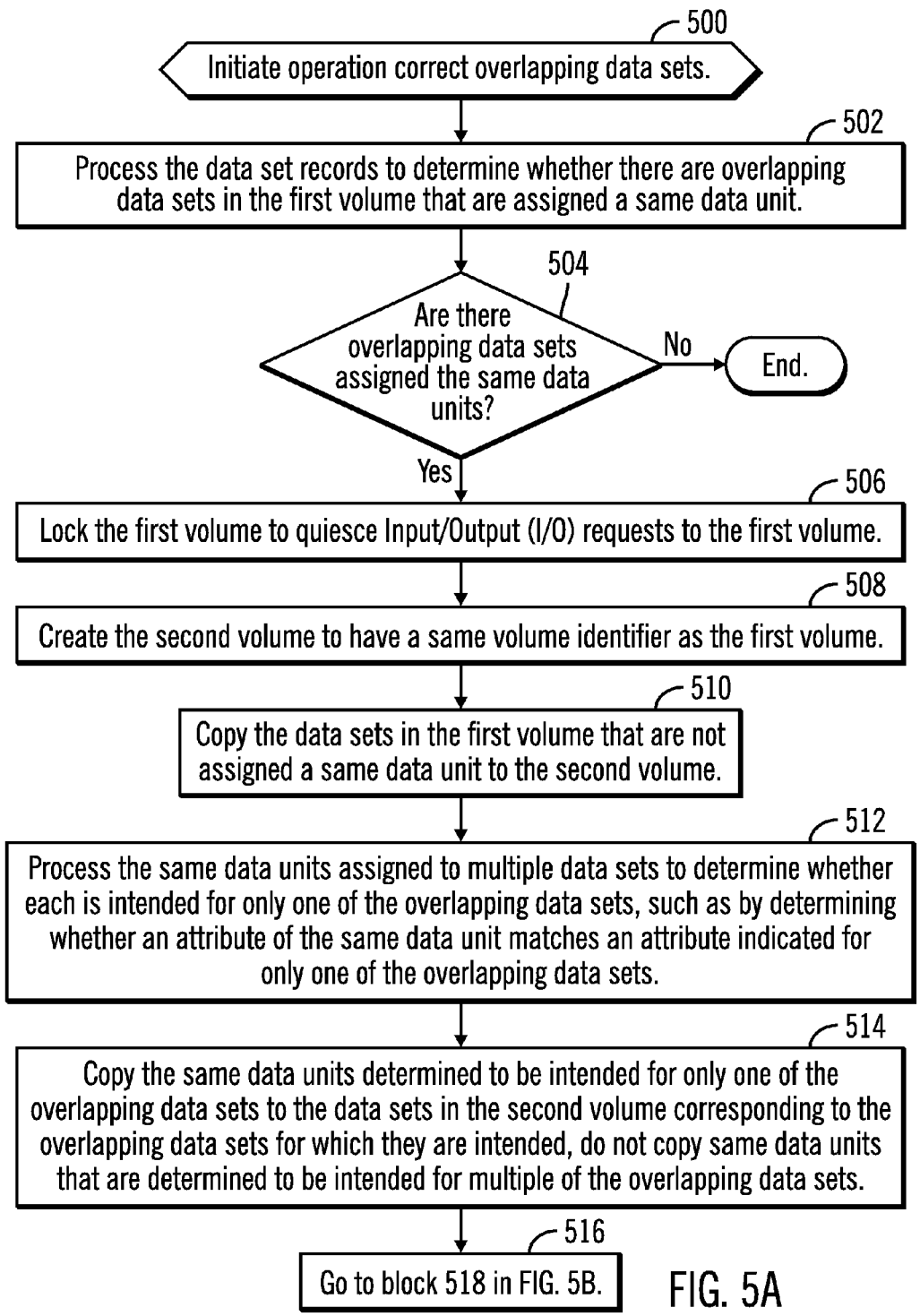

CORRECTING OVERLAPPING DATA SETS IN A VOLUME

BACKGROUND OF THE INVENTION

1. Field of the Invention

The present invention relates to a computer program product, system, and method for correcting overlapping data sets in a volume.

2. Description of the Related Art

In certain computing environments, multiple host systems may configure data sets in volumes configured in a storage system, such as interconnected storage devices, e.g., a Direct Access Storage Device (DASD), Redundant Array of Inde-pendent Disks (RAID), Just a Bunch of Disks (JBOD), etc. Data sets are comprised of extents, which may comprise any grouping of tracks and data storage units. The Z/OS® operating system from International Business Machines Corporation ("IBM") has a Volume Table of Contents (VTOC) to provide information on data sets of extents configured in the volume, where the VTOC indicates the location of tracks, extents, and data sets for a volume in storage.

Data corruption is one of the most costly types of errors that can occur on computing systems today. Data corruption may be the result of program bugs, user errors, or Original Equipment Manufacturer (OEM) interactions. One of the more common types of data corruption that can occur with data sets is data being overlaid onto two different data sets, so that multiple data sets believe they both own the same region in storage. This can occur when the volume table of contents becomes corrupted. This corruption often goes undetected until applications encounter errors due to incorrect or missing data. This type of corruption can expand throughout the volume the longer this error remains undetected, leading to system outages and lengthy recovery times. Also, this type of corruption may be propagated by mirroring technology to both the primary volume and recovery sites.

SUMMARY

Provided are a computer program product, system, and method for correcting overlapping data sets in a volume. A determination is made of overlapping data sets in a first volume that are assigned a same data unit. The data sets in the first volume that are not assigned a same data unit are copied to a second volume. The same data unit is processed to determine one of the overlapping data sets for which the same data unit is intended and copied to the determined overlapping data set in the second volume.

BRIEF DESCRIPTION OF THE DRAWINGS

FIGS. 5a and 5b illustrate an embodiment of operations to correct overlapping data sets.

DETAILED DESCRIPTION

Described embodiments provide techniques for detecting overlapping data sets in a volume that are erroneously assigned the same data units or tracks. Overlapping data sets can propagate data corruption throughout the storage. Described embodiments provide techniques for recovering from overlapping data set errors by copying the data units that are not in overlapping data sets to a new volume that will replace the original volume. The data units remaining in the original volume that are in overlapping data sets are then processed to determine the data sets to which they are intended, and then copied to that intended data set. An error may be generated for the overlapping data sets that do not have all their data units copied over to the new volume. In this way, the new recovered volume eliminates any of the overlapping data sets and resulting data corruption going forward.

Figure 1:
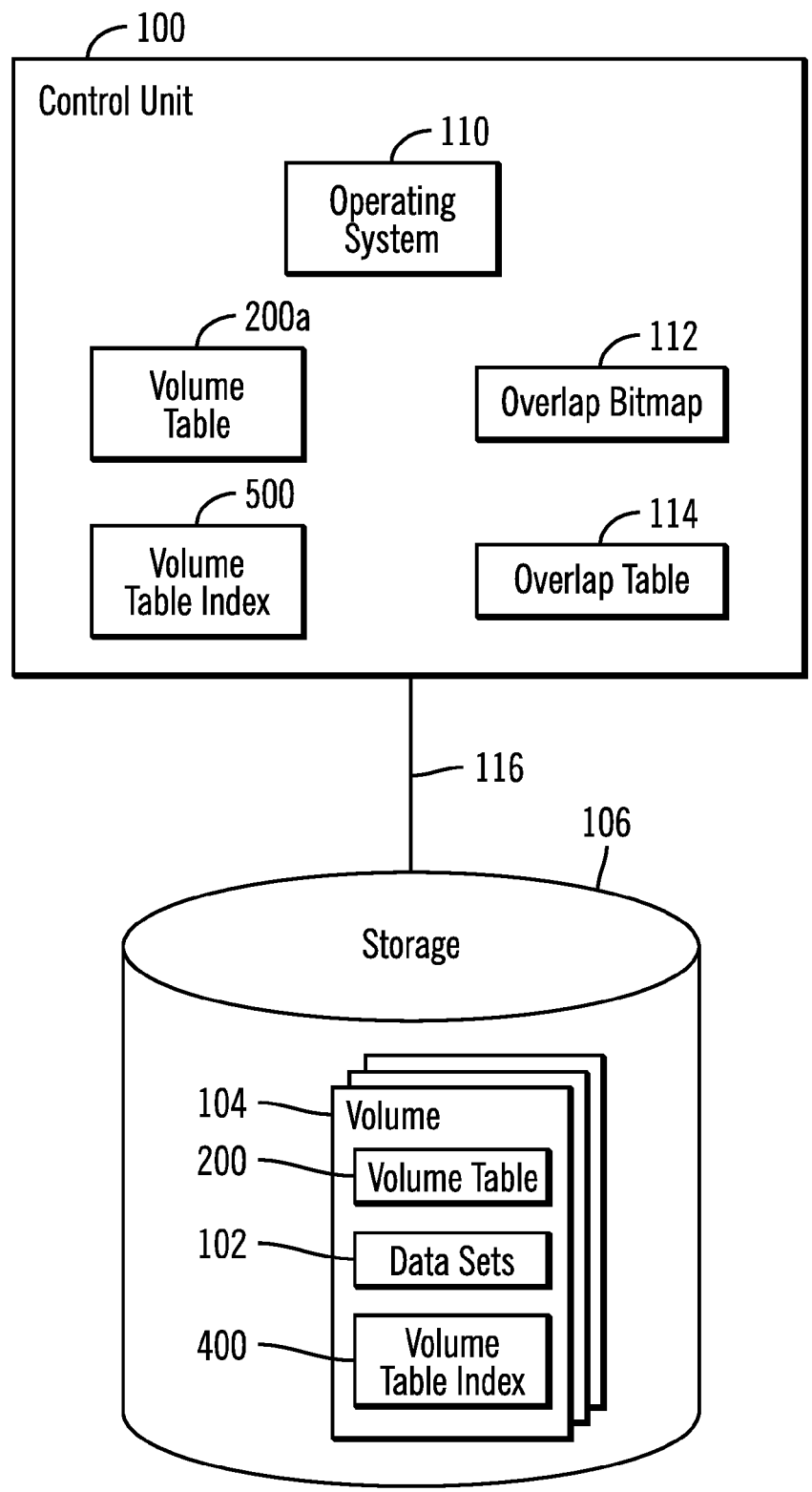
FIG. 1 illustrates an embodiment of a storage environment.

FIG. 1 illustrates an embodiment of a computing environment including a control unit 100, such as a storage controller or server, that manages access to data sets 102 configured in volumes 104 in a storage 106 by hosts (not shown). A data set 102 comprises a collection of data intended to be stored in a same logical allocation of data, such as data from a single application, user, enterprise, etc. A data set 102 may be comprised of separate files or records, or comprise a single file or record. Each record or file in the data set 102 may be comprised of extents of data.

The control unit 100 includes an operating system 110 to manage the storage of data sets 102 in the volumes 104. The operating system 110 may comprise the IBM z/OS® operating system or other operating systems for managing data sets in volumes or other logical data structures. (IBM and z/OS are trademarks of IBM worldwide).

Each volume 104 includes a volume table 200 having information on the volume 104 to which it pertains, including a mapping of tracks and extents of tracks to data sets 102. The volume table 200 may be stored in the volume 104, such as in the first few records of the volume, i.e., starting at the first track in the volume 104. In IBM z/OS operating system implementations, the volume table 200 may comprise a volume table of contents (VTOC). The volume tables 200 may comprise contiguous space data sets having contiguous tracks or physical addresses in the storage 106. In alternative embodiments, the volume table 200 may comprise a file allocation table stored separately from the volume 104 or within the volume 104.

The control unit 100 may maintain copies of the volume tables 200a to use to manage the data sets 102 in the volumes 104. In z/OS implementations, the volume table 200, e.g., VTOC, may include information on locations of data sets in the volume 104, such as a mapping of tracks in the data sets to storage locations in the volume. In alternative embodiments, the volume table 200 may comprise other types of file allocation data structures that provide a mapping of data to storage locations, either logical and/or physical storage locations. In this way, the volume table 200 provides a mapping of tracks to data sets 102 in the volume 104. In further embodiments, the volume table 200 may include a volume name and data set records indicating data sets having extents configured in the volume 104. Each data set record may have information for each data set 102 in a volume 104, including the data units (e.g., tracks, blocks, etc.) assigned to the data set 102. Tracks may be stored in extents, which provide a mapping or grouping of tracks in the volume 102.

The volume 104 may further include a volume table index 400 that maps data set names to data set records in the volume table 200.

The operating system 110 may also generate an overlap bitmap 112 and an overlap table 114 that are used to correct overlapping data sets 102 in the volume 104.

The storage 106 may comprise one or more storage devices known in the art, such as a solid state storage device (SSD) comprised of solid state electronics, EEPROM (Electrically Erasable Programmable Read-Only Memory), flash memory, flash disk, Random Access Memory (RAM) drive, storage-class memory (SCM), Phase Change Memory (PCM), resistive random access memory (RRAM), spin transfer torque memory (STM-RAM), conductive bridging RAM (CBRAM), magnetic hard disk drive, optical disk, tape, etc. The storage devices may further be configured into an array of devices, such as Just a Bunch of Disks (JBOD), Direct Access Storage Device (DASD), Redundant Array of Independent Disks (RAID) array, virtualization device, etc. Further, the storage devices may comprise heterogeneous storage devices from different vendors or from the same vendor.

The control unit 100 communicates with the storage 106 via connection 116. The connection 116 may comprise one or more networks, such as a Local Area Network (LAN), Storage Area Network (SAN), Wide Area Network (WAN), peer-to-peer network, wireless network, etc. Alternatively, the connection 116 may comprise bus interfaces, such as a Peripheral Component Interconnect (PCI) bus or serial interface.

Figure 2:
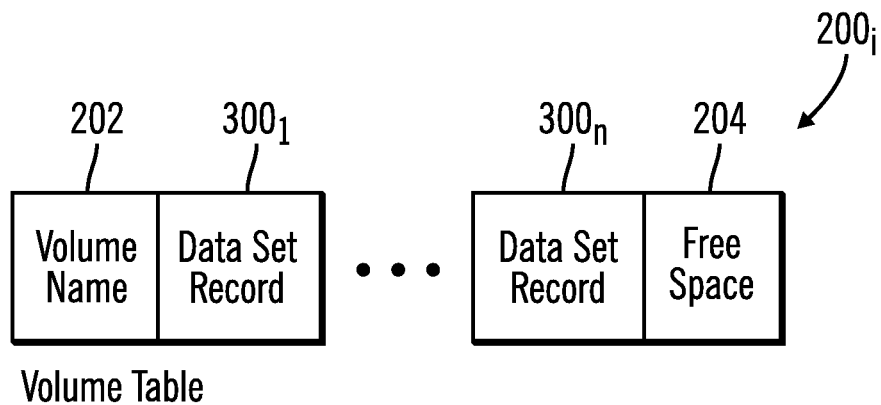
FIG. 2 illustrates an embodiment of a volume table.

FIG. 2 illustrates an arrangement of information maintained in an instance of a volume table $200_i$ for one volume $104_i$. The volume table instance $200_i$ includes a volume name 202, also known as a volume serial number, e.g., a VOLSER, that provides a unique identifier of the volume. The volume name 202 may be included in the name of the volume table $200_i$ in the volume $104_i$. The volume table $200_i$ instance further includes one or more data set records $300_1 \ldots 300_n$ indicating data sets having extents of tracks configured in the volume $104_i$ represented by the volume table $200_i$. The volume table $200_i$ further includes one or more free space records 206 identifying ranges of available tracks in the volume $200_i$ in which additional data set records $300_{n+1}$ can be configured. In embodiments where the operating system 110 comprises the Z/OS operating system, the data set records may comprise data set control blocks.

Figure 3:
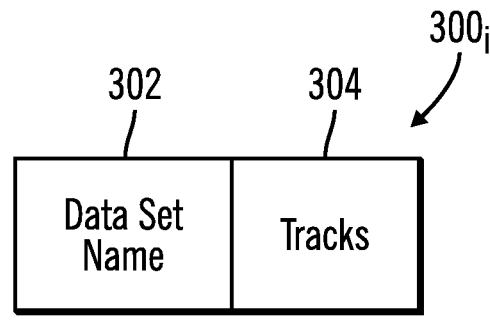
FIG. 3 illustrates an embodiment of a data set record.

FIG. 3 illustrates an embodiment of an instance of a data set record 300—such as one of the data set records $300_1 \ldots 300_n$ included in the volume table $200_i$. Each data set record $300_i$ includes a data set name 302 and tracks 304 allocated to the data set 302. The tracks 304 may be expressed as disk, cylinder, head and record location (CCHHR), or other formats. Terms such as tracks, data units, blocks, etc., may be used interchangeably to refer to a unit of data managed in the volume 104. The volume table 200 may be located at track 0 and cylinder 0 of the volume 104. Alternatively, the volume table 200 may be located at a different track and cylinder number than the first one.

Figure 4:
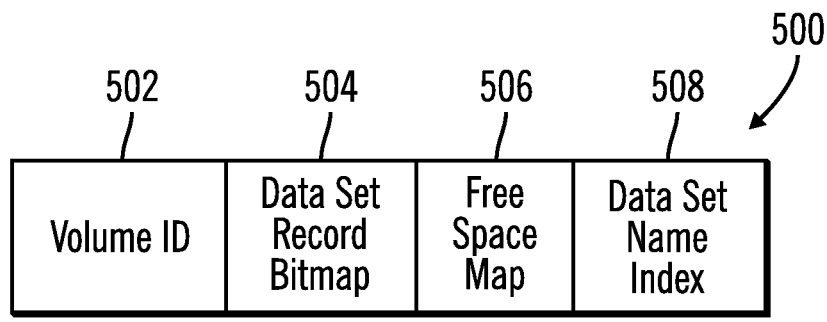
FIG. 4 illustrates an embodiment of a volume table index.

FIG. 4 illustrates an embodiment of the volume table index 500 as including a volume identifier (ID) 502 identifying the volume 104 and by extension the volume table 200 for which the index is provided; a data set record bitmap 504 that has a bit for each data set record that can be assigned for the volume 502, where a bit is set if the data set record is used in the volume 502 for a data set; a free space map 506 that has a bit for each track in the volume 104 and is set to indicate when the track is assigned to a data set; and a data set name index 508 that has an entry for each data set configured in the volume 502 which indexes the data set records $300_1 \ldots 300_n$ in the volume table 200 by data set name, to provide a pointer to the data set record $300_1 \ldots 300_n$ in the volume table $200_i$ for each data set name.

Figure 5B:
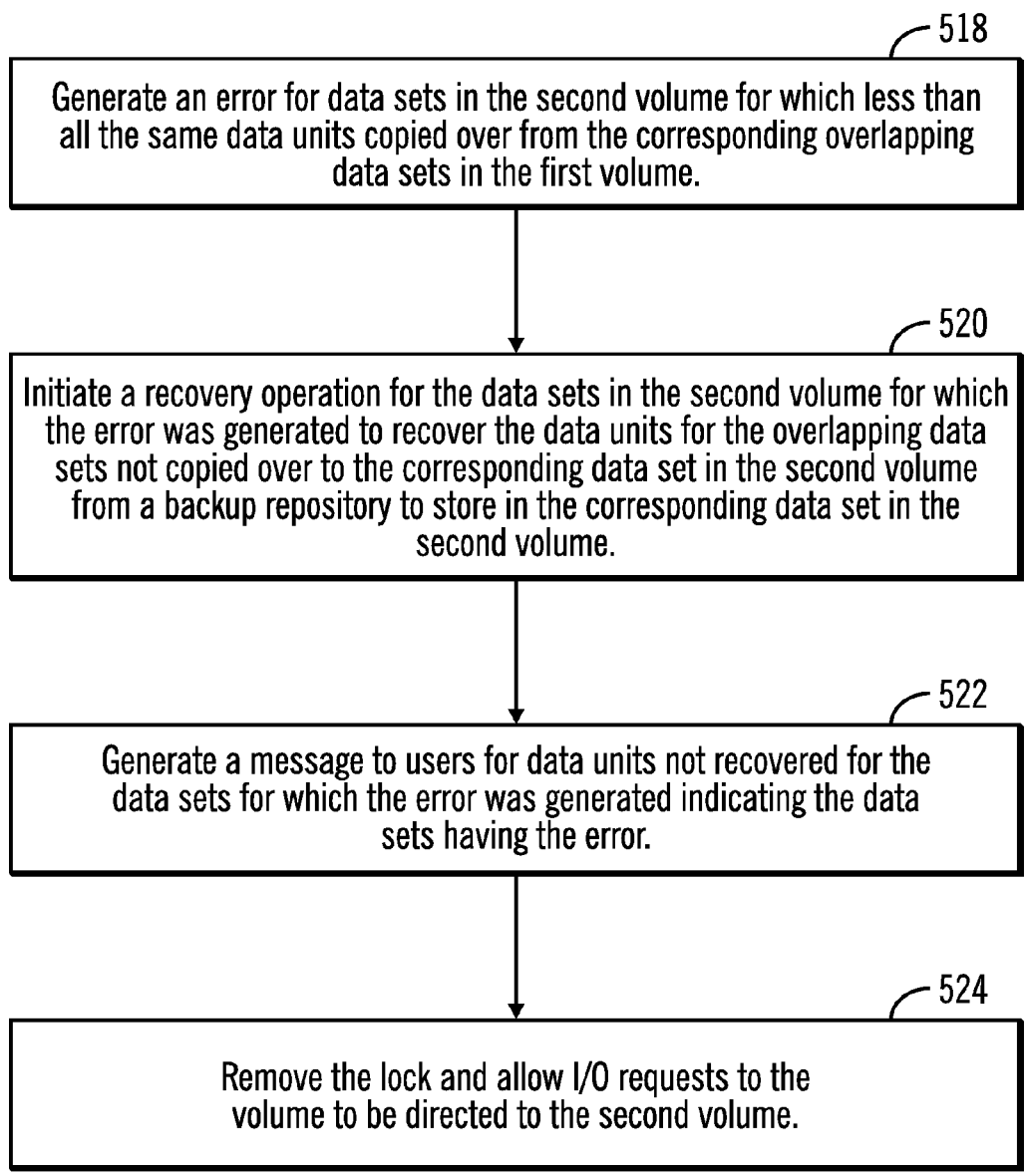

FIGS. 5a and 5b illustrate an embodiment of operations performed by the operating system 110 or some other component to correct the error of overlapping data sets 102 that share the same one or more tracks. Upon initiating (at block 500) an operation to correct overlapping data sets, the operating system 110 processes (at block 502) the data set records 102 to determine whether there are overlapping data sets 102 in a first volume $104_1$ that are assigned a same data unit. A data unit may comprise a track, logical block address or other addressable unit of data. If (at block 504) there are no overlapping data sets 102 assigned the same data units, then there is no overlapping data set error and control ends. Otherwise, if (at block 504) there are at least two data sets 102 in the first volume $104_1$ assigned the same tracks, i.e., share tracks, the operating system 110 locks (at block 506) the first volume $104_1$ to quiesce Input/Output (I/O) requests to the first volume $104_1$. A second volume $104_2$ is created (at block 508) that has the same volume name, e.g., volume identifier as the first volume $104_1$. The second volume $104_2$ will eventually replace the first volume $104_1$, and be free of overlapping data sets 102.

The operating system 110 copies (at block 510) the data sets 102 in the first volume $104_1$ that are not assigned a same data unit to the second volume $104_2$. The operating system 110 processes (at block 512) the same data units assigned to multiple data sets 102 to determine whether each same data unit is intended for only of the overlapping data sets 102 assigned that same data unit. For instance, in one embodiment, the operating system 110 may determine whether an attribute of the data unit matches an attribute indicated for only one of the overlapping data sets. For instance, the attribute may comprise a format or block structure of the data unit, a type of content, or some other attribute associated with both the data set and data unit that can be used to determine the overlapping data set for which the data unit is intended. The same data units determined to be intended for only one of the overlapping data sets are copied (at block 514) to the data sets in the second volume $104_2$ that correspond to the overlapping data sets for which the data units are intended.

With the described embodiments, the data set in the second volume $104_2$ corresponding to the overlapping data set in the first volume $104_1$ for which the data unit is not intended, does not receive a copy of that data unit, which only goes to the data set in the second volume $104_2$ corresponding to the overlapping data set in the first volume $104_1$ for which the data unit was intended. If the data unit is determined not to be intended for any of the overlapping data sets or is determined to be intended for multiple of the overlapping data sets, then that same data unit is not copied to any of the data sets 102 in the second volume $104_2$ corresponding to the overlapping data sets 102 in the first volume $104_1$. This leaves some of the data sets in the second volume $104_2$ corresponding to overlapping data sets in the first volume $104_1$ with missing data units and errors, which may be corrected. Further, the first volume $104_1$ retains those same data units that cannot be determined to be intended for only one of the overlapping data sets on the first volume $104_1$.

Control then proceeds (at block 516) to block 518 in FIG. 5b where the operating system 110 generates an error for data sets 102 in the second volume $104_2$ for which less than all the data units were copied over from the corresponding overlapping data sets 102 in the first volume $104_1$. In other words, the error is generated for those data sets in the second volume $104_2$ for which not all the data units in the corresponding data set 102 in the first volume $104_1$ were copied because they were assigned to multiple data sets 102 in the first volume $104_1$ and they could not be determined to be intended for only one of the overlapping data sets 102.

The operating system 110 may further initiate (at block 520) a recovery operation for the data sets 102 in the second volume $104_2$ for which the error was generated to recover the data units not copied over to the second volume $104_2$ from a backup repository. Recovered data units are stored in the corresponding data set 102 in the second volume $104_2$. For data sets 102 that cannot be recovered from a backup repository, a message may be generated (at block 522) to a user or administrator indicating the data sets 102 having incomplete data to allow the user to correct. After this process, those data sets 102 that could not have all their data units resolved from copying over from the first volume $104_1$, recovering from a backup repository or user manual correction, may be marked as empty or in an error state. The lock may then be removed (at block 524) from the volume to allow I/O requests directed to the volume to be directed to the second volume $104_2$, comprising the new version of the volume $104_1$ free of any overlapping data sets.

Figure 6A:
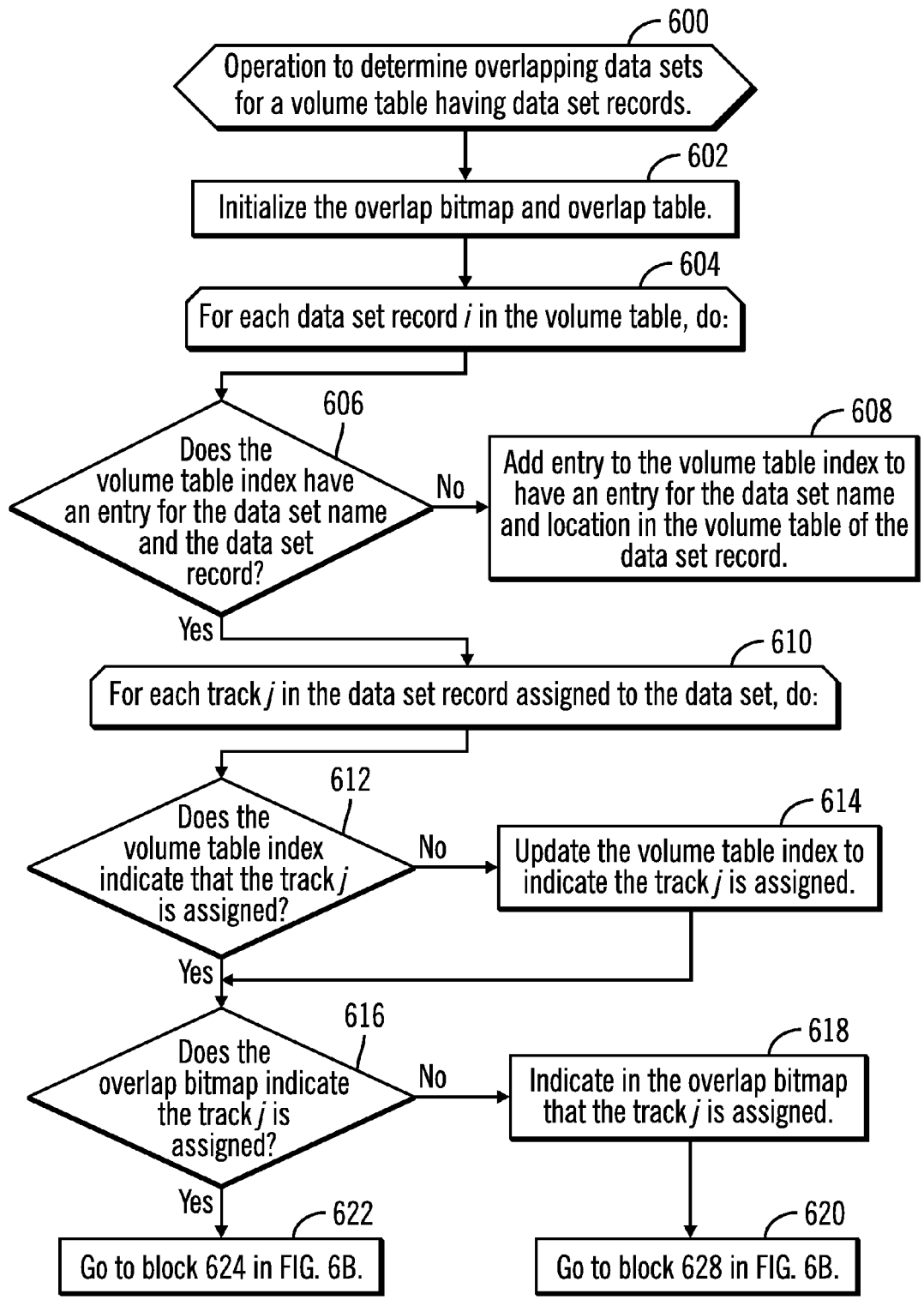
FIGS. 6a and 6b illustrate an embodiment of operations to detect overlapping data sets.
Figure 6B:
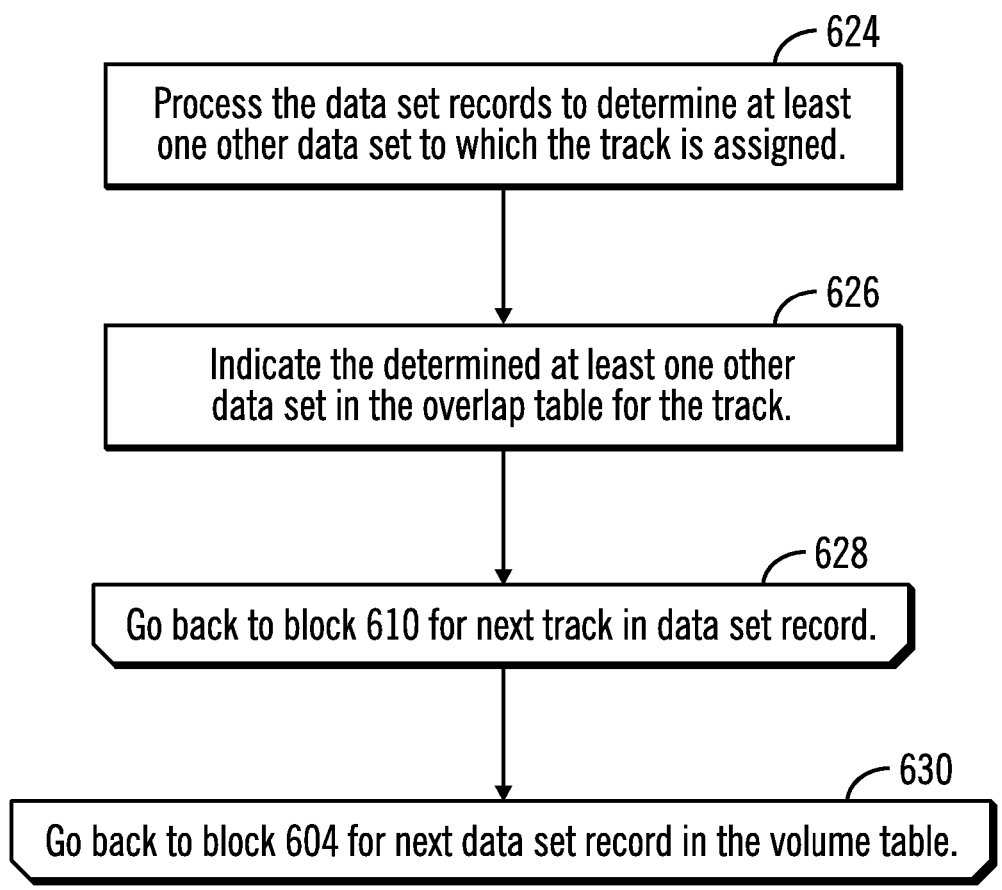

With the described operations of FIGS. 6a and 6b, overlapping data sets are removed by rebuilding the volume and copying over data units that are not assigned to multiple overlapping data sets, and then attempting different recovery operations to determine if the data units assigned to multiple data sets can be resolved from the data units in the volume $104_1$, from a backup repository or from user correction. If the shared data units cannot be resolved to one of the data sets 102 in the second volume $104_2$, then those overlapping data sets whose data units cannot be recovered may indicate an error state or be somehow cleared to allow I/O operations to continue against the new version of the volume $104_2$.

FIGS. 6a and 6b illustrate an embodiment of operations performed by the operating system 110 or some other component to determine whether there are overlapping tracks in embodiments where a volume table 200 has data set records 300, providing information on the data sets 102 configured in the storage 106 and when there is a volume table index 400 for the volume table 200. Upon initiating (at block 600) the operation to determine overlapping data sets for a volume table 104 having data set records $300_1 \ldots 300_n$, the operating system 110 initializes (at block 602) an overlap bitmap 112 and an overlap table 114. The overlap bitmap 112 may have a bit for each track in the volume 104 that is initially set to indicate that all tracks have not been assigned to a data set 102. The operating system 110 then performs a loop of operations at blocks 604 through 630 for each data set record 300, in the volume table 200. If (at block 606) the volume table index 500 does not have an entry for the data set name of the data set record $300_i$, then the operating system 110 adds (at block 608) an entry to the data set name index 508 in the volume table index 502 to have an entry for the data set name and location in the volume table 200 of the data set record $300_i$. From block 608 or if (at block 606) the data set name index 508 already has an entry for the data set record $300_i$, control proceeds to block 610 where the operating system 110 performs a loop of operations at block 610 through 628 for each track j in data set $300_i$, such as indicated in the tracks 304 of the data set record $300_i$.

If (at block 612) the free space map 506 of the volume table index 500 does not indicate that track j is assigned to a data set 102, then the free space map 506 is updated (at block 614) to indicate that track j is assigned, such as by updating the bit for track j in the free space map 506. From block 614 or if (at block 612) the volume table index 500 indicates that track j is assigned, the operating system 110 determines (at block 616) whether the overlap bitmap 112 indicates that track j is already assigned to a data set 102. If not, then the overlap bitmap 112 is updated (at block 618) to indicate that the track j is assigned and control proceeds (at block 620) to block 628 in FIG. 6b to consider the next track in the data set record 300, or the next data set record if all tracks in the data set record $300_i$ have been considered.

If (at block 616) the overlap bitmap 112 indicates that track j is already assigned to another data set 102, then control proceeds (at block 622) to block. 624 in FIG. 6b where the data set records $300_1 \ldots 300_n$ in the volume table 200 are processed to determine at least one other data set 102 to which the track j is assigned. The determined overlapping data sets to which track j is assigned are indicated (at block 626) in the overlap table 114 for the track j. Control then proceeds from block 626 to block 628 to consider any further tracks in data set record 300, or to block 630 to consider any further data set records in the volume 104.

The operations of FIGS. 6a and 6b scan through data set records $300_1 \ldots 300_n$ in a volume table 104 to determine the tracks that are assigned to overlapping data sets. After indicating in the overlap table 114 the overlapping data sets and the tracks they share, control may proceed to block 506 in FIG. 5a to reconstruct the volume table $104_1$ as volume table $104_2$ so as not to have any shared tracks in overlapping data sets that can result in data loss and other data errors. The processing of the tracks and overlapping data sets would be done from the overlap table 114 which indicates the tracks and overlapping data sets for the operating system 110 to consider in the operations of FIGS. 5a and 5b.

The reference characters used herein, such as i, j, and n, are used to denote a variable number of instances of an element, which may represent the same or different values, and may represent the same or different value when used with different or the same elements in different described instances.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 7:
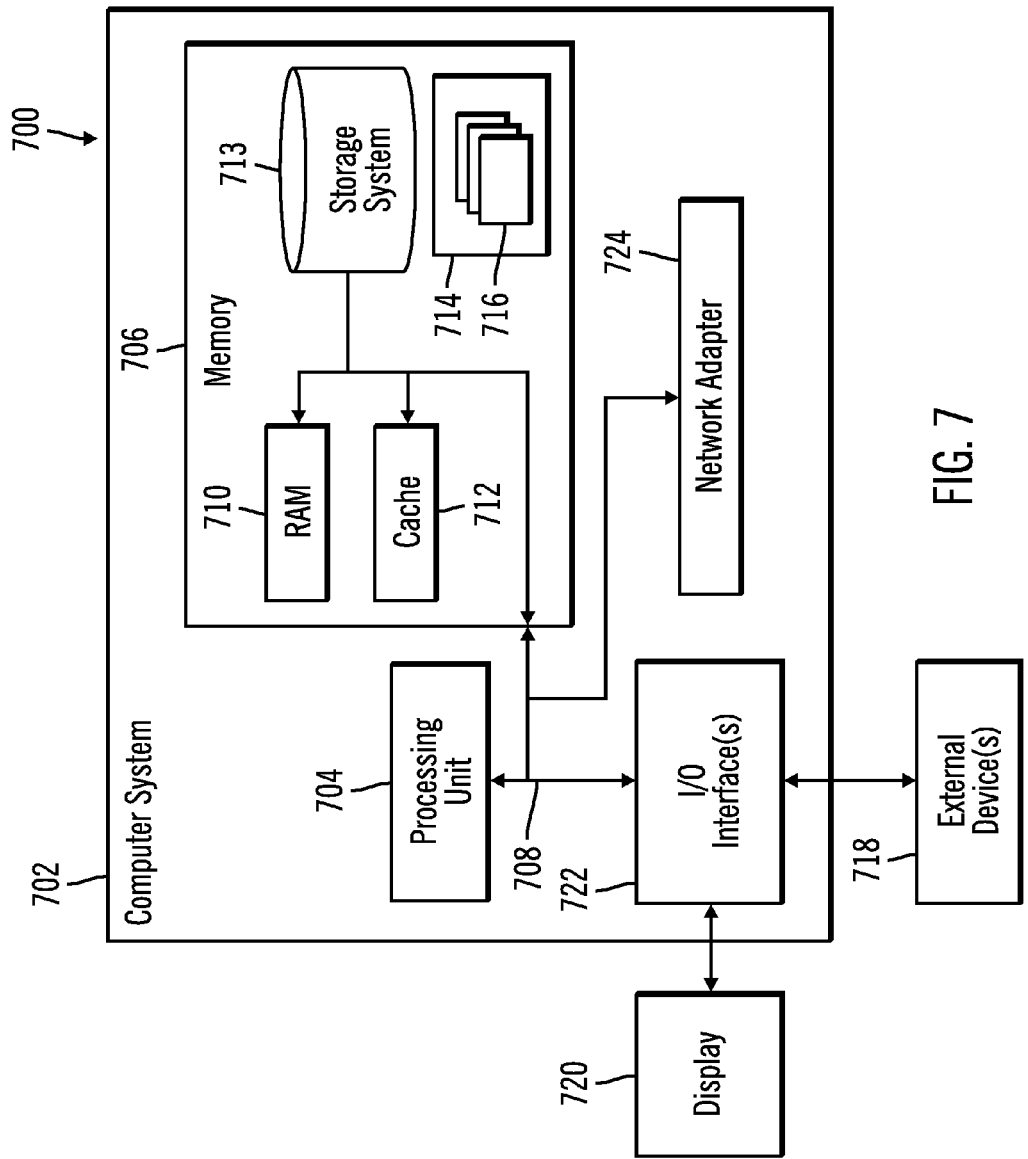
FIG. 7 illustrates a computing environment in which the components of FIG. 1 may be implemented.

The computational components of FIG. 1, including the control unit 100, may be implemented in one or more computer systems, such as the computer system 902 shown in FIG. 7. Computer system/server 702 may be described in the general context of computer system executable instructions, such as program modules, being executed by a computer system. Generally, program modules may include routines, programs, objects, components, logic, data structures, and so on that perform particular tasks or implement particular abstract data types. Computer system/server 702 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 7, the computer system/server 702 is shown in the form of a general-purpose computing device. The components of computer system/server 702 may include, but are not limited to, one or more processors or processing units 704, a system memory 706, and a bus 708 that couples various system components including system memory 706 to processor 704. Bus 708 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 702 typically includes a variety of computer system readable media. Such media may be any available media that is accessible by computer system/server 702, and it includes both volatile and non-volatile media, removable and non-removable media.

System memory 706 can include computer system readable media in the form of volatile memory, such as random access memory (RAM) 710 and/or cache memory 712. Computer system/server 702 may further include other removable/non-removable, volatile/non-volatile computer system storage media. By way of example only, storage system 713 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 708 by one or more data media interfaces. As will be further depicted and described below, memory 706 may include at least one program product having a set (e.g., at least one) of program modules that are configured to carry out the functions of embodiments of the invention.

Program/utility 714, having a set (at least one) of program modules 716, may be stored in memory 706 by way of example, and not limitation, as well as an operating system, one or more application programs, other program modules, and program data. Each of the operating system, one or more application programs, other program modules, and program data or some combination thereof, may include an implementation of a networking environment. The components of the computer 702 may be implemented as program modules 716 which generally carry out the functions and/or methodologies of embodiments of the invention as described herein. The systems of FIG. 1 may be implemented in one or more computer systems 702, where if they are implemented in multiple computer systems 702, then the computer systems may communicate over a network.

Computer system/server 702 may also communicate with one or more external devices 718 such as a keyboard, a pointing device, a display 720, etc.; one or more devices that enable a user to interact with computer system/server 702; and/or any devices (e.g., network card, modem, etc.) that enable computer system/server 702 to communicate with one or more other computing devices. Such communication can occur via Input/Output (I/O) interfaces 722. Still yet, computer system/server 702 can communicate with one or more networks such as a local area network (LAN), a general wide area network (WAN), and/or a public network (e.g., the Internet) via network adapter 724. As depicted, network adapter 724 communicates with the other components of computer system/server 702 via bus 708. It should be understood that although not shown, other hardware and/or software components could be used in conjunction with computer system/server 702. Examples, include, but are not limited to: microcode, device drivers, redundant processing units, external disk drive arrays, RAID systems, tape drives, and data archival storage systems, etc.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for managing data sets assigned data units in a first volume in a storage, wherein the computer program product comprises a computer readable storage medium having program instructions embodied therewith, the program instructions executable by a processor to cause operations, the operations comprising:
   determining overlapping data sets in the first volume that are assigned a same data unit;
   copying the data sets in the first volume that are not assigned a same data unit to a second volume;
   processing the same data unit to determine one of the overlapping data sets for which the same data unit is intended; and
   copying the same data unit to the determined overlapping data set in the second volume.

2. The computer program product of claim 1, wherein the operations further comprise:
   generating an error for the data set in the second volume corresponding to the overlapping data set in the first volume for which the same data unit was not intended.

3. The computer program product of claim 1, wherein there are a plurality of same data units assigned to the overlapping data sets, wherein the operations further comprise:

initiating a recovery operation for a corresponding data set in the second volume corresponding to the overlapping data set in the first volume that did not have all its data units copied over from the first volume.

4. The computer program product of claim 3, wherein the recovery operation comprises:
recovering the data units for the overlapping data set not copied over to the corresponding data set in the second volume from a backup repository to store in the corresponding data set in the second volume.

5. The computer program product of claim 1, wherein there are a plurality of same data units assigned to the overlapping data sets, wherein the operations further comprise:
determining that less than all the same data units were copied to a data set in the second volume corresponding to one of the overlapping data sets in the first volume; and
generating an error for the data set in the second volume for which less than all the same data units were copied from the corresponding overlapping data set in the first volume.

6. The computer program product of claim 1, wherein there are a plurality of same data units assigned to the overlapping data sets, wherein the operations further comprise:
for each of the same data units, determining whether an attribute of the same data unit matches an attribute indicated for one of the overlapping data sets, wherein the same data unit is intended for the overlapping data set having the attribute that matches the attribute of the same data unit.

7. The computer program product of claim 6, wherein the attribute comprises a data unit format, wherein the one overlapping data set having the data unit format matching the data unit format of the same data unit comprises the data set intended for the same data unit.

8. The computer program product of claim 6, wherein the operations further comprise:
generating errors for both the overlapping data sets when both the overlapping data sets have a same attribute that matches the attribute of the overlapping data unit, wherein the overlapping data unit does not belong to either of the overlapping data sets when they have the same attribute matching the attribute of the overlapping data set.

9. The computer program product of claim 1, wherein the operations further comprise:
locking the first volume to quiesce Input/Output (I/O) requests to the first volume in response to determining that the overlapping data sets are assigned the same data unit;
creating the second volume to have a same volume identifier as the first volume in response to quiescing the I/O requests;
retaining same data units on the first volume that cannot be determined to be intended for only one of the overlapping data sets on the first volume; and
allowing I/O requests directed to the data sets on the first volume to access the data sets on the second volume in response to copying the data sets to the second volume.

10. The computer program product of claim 1, wherein a volume table for the first volume includes data set records identifying the data sets in the first volume and the data units assigned to the data set, wherein the determining the overlapping data sets comprises:
processing the data set records to determine data units assigned to multiple data sets, wherein the determined data units comprise overlapping data units and the multiple data sets to which the determined data units are assigned comprise the overlapping data sets.

11. The computer program product of claim 10, wherein the processing the data set records comprises:
processing each of the data set records by performing:
for each of the data units indicated in the data set record, performing:
determining whether an overlap bitmap indicates that the data unit is assigned to another data set, wherein the overlap bitmap includes a bit for each data unit in the first volume;
indicating in the overlap bitmap that the data unit is assigned in response to determining that the overlap bitmap does not indicate that the data unit is not assigned;
processing the data set records to determine one other data set to which the data unit is assigned in response to determining that the overlap bitmap indicates that the data unit is assigned; and
indicating the data set and the determined one other data set to which the data unit is assigned in an overlap table in response to processing the data set records; and
processing each of the data units indicated in the overlap table to determine whether the data unit is intended for one of the overlapping data sets indicated in the overlap table for the processed data unit.

12. The computer program product of claim 10, wherein a first volume table index indexes data set names to the data set records in the first volume table for the data set names, wherein when processing the data set records, further performing:
determining whether the first volume table index provides an entry for each data set record defined in the first volume table to map the data set name for the data set record to the data set record; and
determining whether the first volume table index indicates each data unit indicated in the data set records as assigned to a data set is used and not free space.

13. A system for managing data sets assigned data units in a first volume in a storage, comprising:
a processor; and
a computer readable storage medium having program instructions that when executed by the processor perform operations, the operations comprising:
determining overlapping data sets in the first volume that are assigned a same data unit;
copying the data sets in the first volume that are not assigned a same data unit to a second volume;
processing the same data unit to determine one of the overlapping data sets for which the same data unit is intended; and
copying the same data unit to the determined overlapping data set in the second volume.

14. The system of claim 13, wherein there are a plurality of same data units assigned to the overlapping data sets, wherein the operations further comprise:
initiating a recovery operation for a data set in the second volume corresponding to the overlapping data set in the first volume that did not have all its data units copied over from the first volume.

15. The system of claim 13, wherein there are a plurality of same data units assigned to the overlapping data sets, wherein the operations further comprise:

for each of the same data units, determining whether an attribute of the same data unit matches an attribute indicated for one of the overlapping data sets, wherein the same data unit is intended for the overlapping data set having the attribute that matches the attribute of the same data unit.

16. The system of claim 13, wherein the operations further comprise:
   locking the first volume to quiesce Input/Output (I/O) requests to the first volume in response to determining that the overlapping data sets are assigned the same data unit;
   creating the second volume to have a same volume identifier as the first volume in response to quiescing the I/O requests;
   retaining same data units on the first volume that cannot be determined to be intended for only one of the overlapping data sets on the first volume; and
   allowing I/O requests directed to the data sets on the first volume to access the data sets on the second volume in response to copying the data sets to the second volume.

17. The system of claim 13, wherein a volume table for the first volume includes data set records identifying the data sets in the first volume and the data units assigned to the data set, wherein the determining the overlapping data sets comprises:
   processing the data set records to determine data units assigned to multiple data sets, wherein the determined data units comprise overlapping data units and the multiple data sets to which the determined data units are assigned comprise the overlapping data sets.

18. The system of claim 17, wherein the processing the data set records comprises:
   processing each of the data set records by performing:
      for each of the data units indicated in the data set record, performing:
         determining whether an overlap bitmap indicates that the data unit is assigned to another data set, wherein the overlap bitmap includes a bit for each data unit in the first volume;
         indicating in the overlap bitmap that the data unit is assigned in response to determining that the overlap bitmap does not indicate that the data unit is not assigned;
         processing the data set records to determine one other data set to which the data unit is assigned in response to determining that the overlap bitmap indicates that the data unit is assigned; and
         indicating the data set and the determined one other data set to which the data unit is assigned in an overlap table in response to processing the data set records; and
   processing each of the data units indicated in the overlap table to determine whether the data unit is intended for one of the overlapping data sets indicated in the overlap table for the processed data unit.

19. A method for managing data sets assigned data units in a first volume in a storage, comprising:
   determining overlapping data sets in the first volume that are assigned a same data unit;
   copying the data sets in the first volume that are not assigned a same data unit to a second volume;
   processing the same data unit to determine one of the overlapping data sets for which the same data unit is intended; and
   copying the same data unit to the determined overlapping data set in the second volume.

20. The method of claim 19, wherein there are a plurality of same data units assigned to the overlapping data sets, further comprising:
   initiating a recovery operation for a data set in the second volume corresponding to the overlapping data set in the first volume that did not have all its data units copied over from the first volume.

21. The method of claim 19, wherein there are a plurality of same data units assigned to the overlapping data sets, further comprising:
   for each of the same data units, determining whether an attribute of the same data unit matches an attribute indicated for one of the overlapping data sets, wherein the same data unit is intended for the overlapping data set having the attribute that matches the attribute of the same data unit.

22. The method of claim 19, further comprising:
   locking the first volume to quiesce Input/Output (I/O) requests to the first volume in response to determining that the overlapping data sets are assigned the same data unit;
   creating the second volume to have a same volume identifier as the first volume in response to quiescing the I/O requests;
   retaining same data units on the first volume that cannot be determined to be intended for only one of the overlapping data sets on the first volume; and
   allowing I/O requests directed to the data sets on the first volume to access the data sets on the second volume in response to copying the data sets to the second volume.

23. The method of claim 19, wherein a volume table for the first volume includes data set records identifying the data sets in the first volume and the data units assigned to the data set, wherein the determining the overlapping data sets comprises:
   processing the data set records to determine data units assigned to multiple data sets, wherein the determined data units comprise overlapping data units and the multiple data sets to which the determined data units are assigned comprise the overlapping data sets.

24. The method of claim 23, wherein the processing the data set records comprises:
   processing each of the data set records by performing:
      for each of the data units indicated in the data set record, performing:
         determining whether an overlap bitmap indicates that the data unit is assigned to another data set, wherein the overlap bitmap includes a bit for each data unit in the first volume;
         indicating in the overlap bitmap that the data unit is assigned in response to determining that the overlap bitmap does not indicate that the data unit is not assigned;
         processing the data set records to determine one other data set to which the data unit is assigned in response to determining that the overlap bitmap indicates that the data unit is assigned; and
         indicating the data set and the determined one other data set to which the data unit is assigned in an overlap table in response to processing the data set records; and
   processing each of the data units indicated in the overlap table to determine whether the data unit is intended for one of the overlapping data sets indicated in the overlap table for the processed data unit.

* * * * *